J. A. WERNER.
ACCOUNTING MACHINE.
APPLICATION FILED OCT. 6, 1913.

1,233,528.

Patented July 17, 1917.
8 SHEETS—SHEET 3.

FIG.3.

Witnesses
Harry W. Lindsey Jr.
H. F. Sadgebury

Inventor
John A. Werner
by R. Elston
Chester H. Bracelton
Attorney

J. A. WERNER.
ACCOUNTING MACHINE.
APPLICATION FILED OCT. 6, 1913.
1,233,528.
Patented July 17, 1917.
8 SHEETS—SHEET 4.
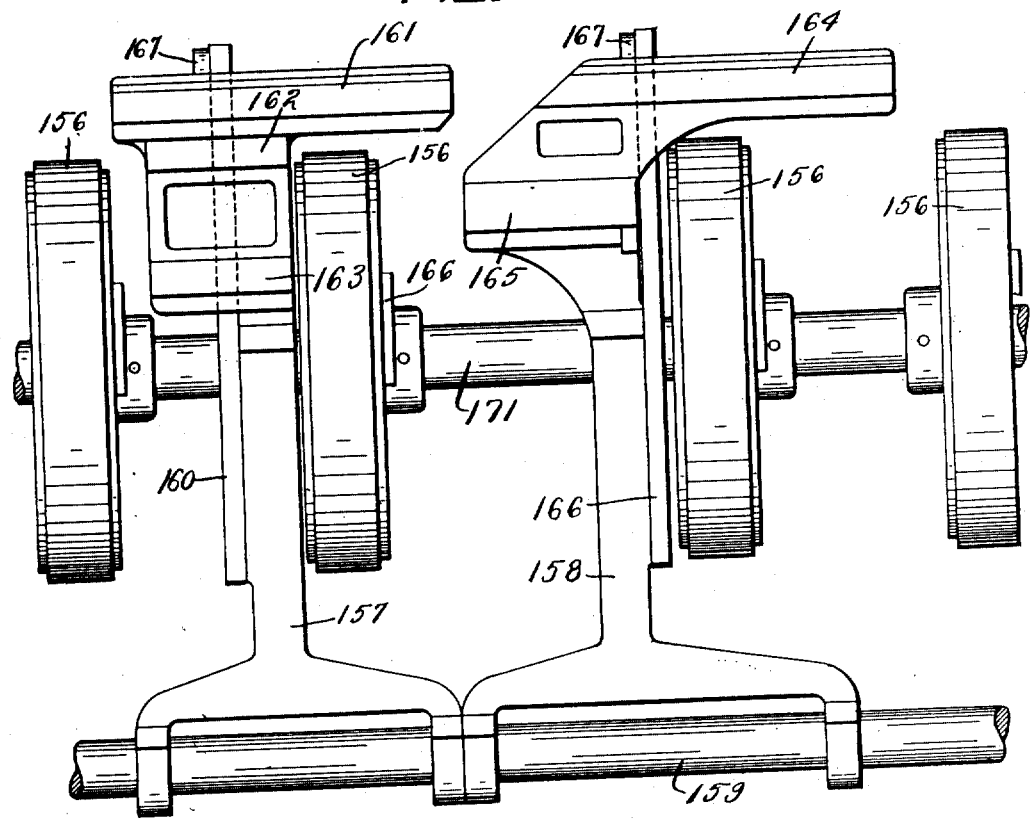
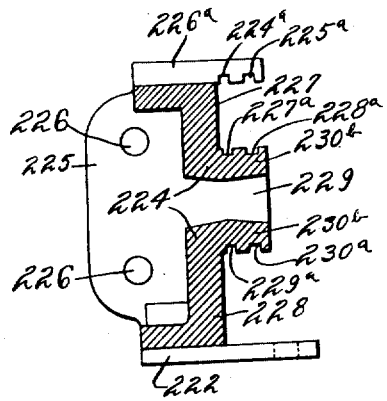
Witnesses
Harry W. Lindsey Jr.
H. F. Sadgebury
Inventor
John A. Werner
by R. C. Glass
Chester H. Braselton
Attorneys

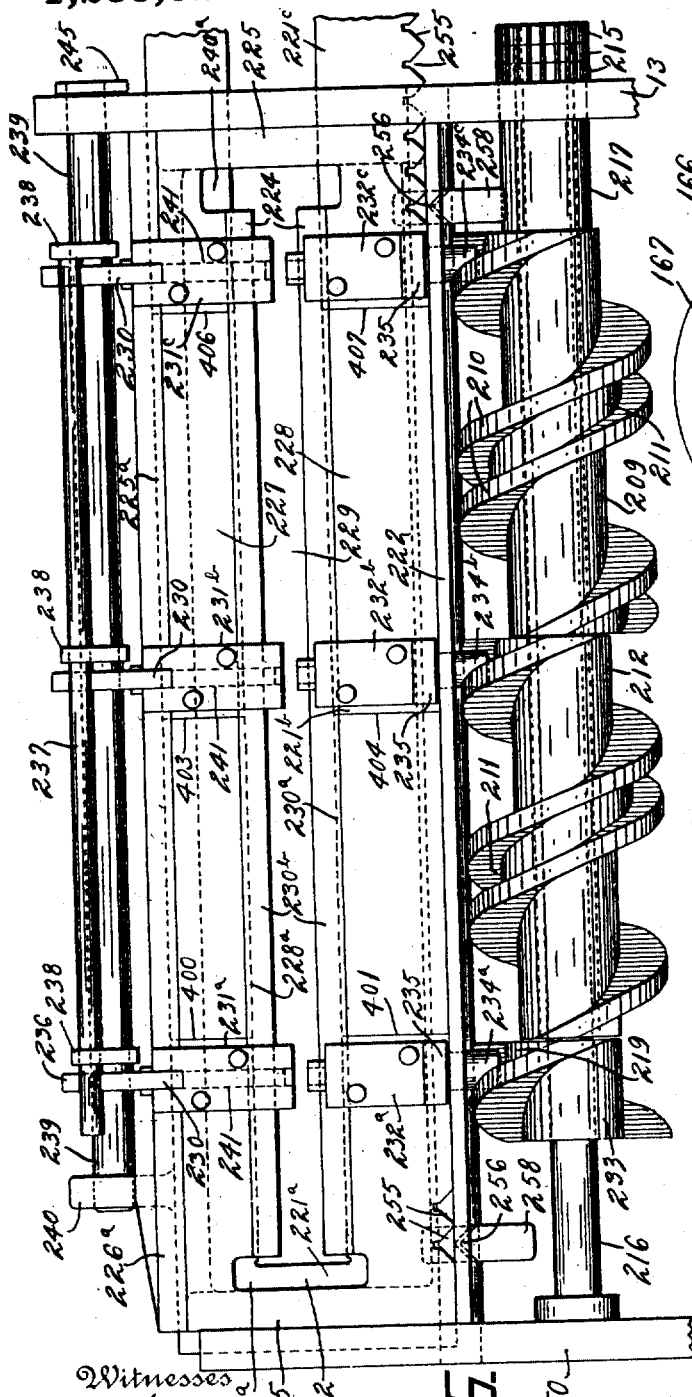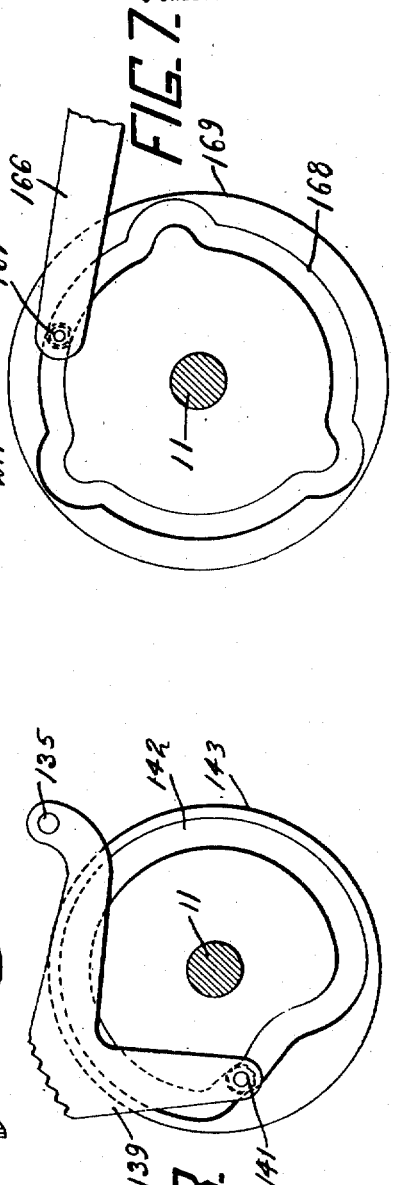

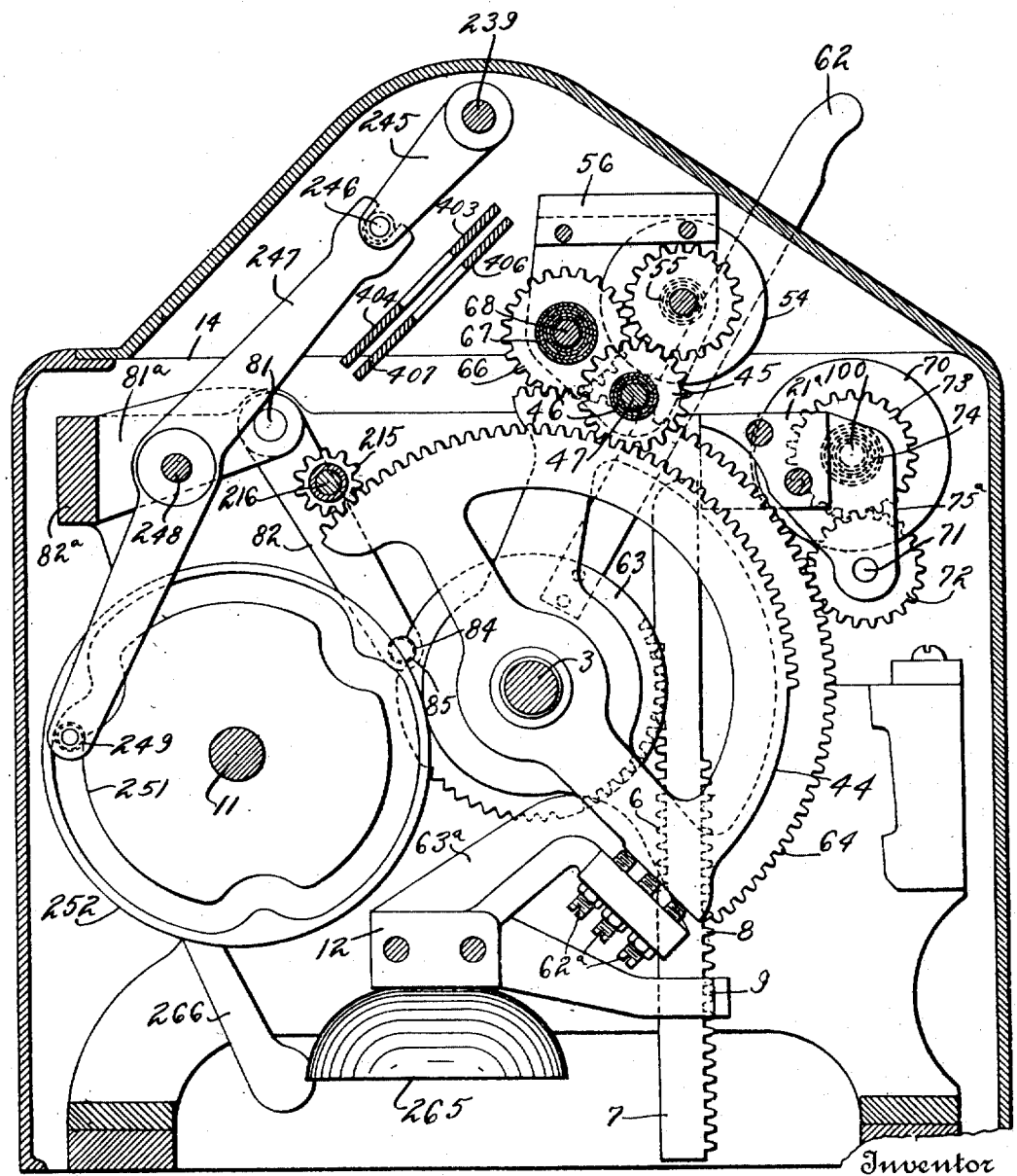

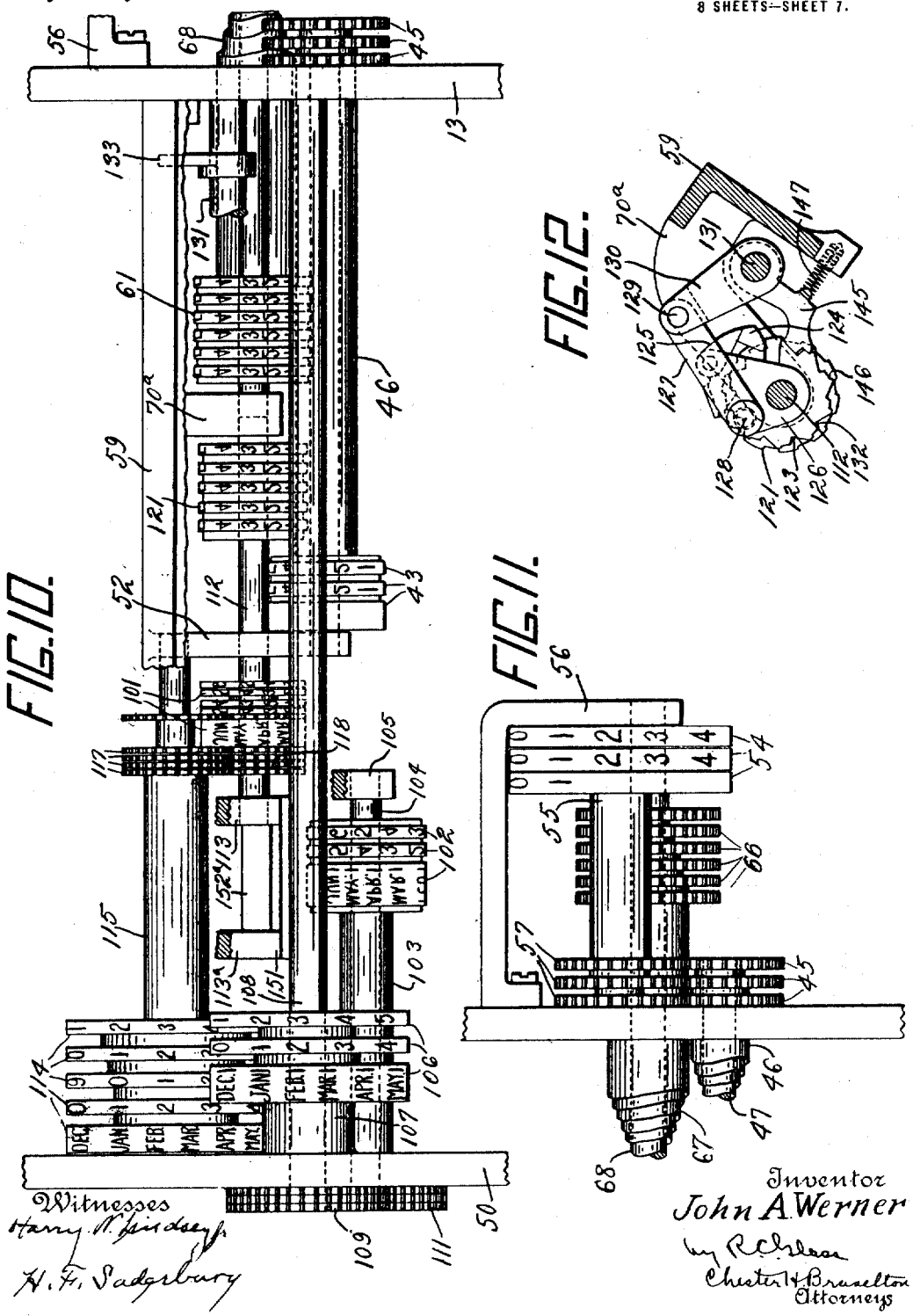

J. A. WERNER.
ACCOUNTING MACHINE.
APPLICATION FILED OCT. 6, 1913.

1,233,528.

Patented July 17, 1917.
8 SHEETS—SHEET 8.

FIG. 13.

| 100 | ○ | 90 | 80 | 70 | 60 | ○ | 40 | 30 | 20 | 10 | 0 | | 9 | 8 | 7 | ○ | 5 | 4 | 3 | 2 | 1 | 0 |

POSTAL SAVINGS SYSTEM — UNITED STATES OF AMERICA
NOT TRANSFERABLE — NOT NEGOTIABLE
WASHINGTON, D.C.   FEB.18,12   56327   128409
DEPOSITORY OFFICE   DATE OF ISSUE   CONSECUTIVE NUMBER   ACCOUNT NUMBER
54286
OFFICE NUMBER           CERTIFICATE OF DEPOSIT   *John Doe*
                                                    NAME OF DEPOSITOR THIS CERTIFIES THAT THE SUM OF  $ 56  HAS BEEN DEPOSITED WITH THE BOARD OF
TRUSTEES OF THE POSTAL SAVINGS SYSTEM AND
INTEREST BEGINS ON THE   WILL BE PAYABLE TO THE DEPOSITOR AT THE ABOVE NAMED   ISSUE OF 1912
FOLLOWING DATE           DEPOSITORY OFFICE WITH INTEREST AT THE RATE OF TWO
MAR.1,12.                PER CENT PER ANNUM PAYABLE ANNUALLY ON THE PRESEN-   SERIAL NUMBER
                         TATION OF THIS CERTIFICATE PROPERLY ENDORSED         563279834

---

| 100 | ○ | 90 | 80 | 70 | 60 | ○ | 40 | 30 | 20 | 10 | 0 | | 9 | 8 | 7 | ○ | 5 | 4 | 3 | 2 | 1 | 0 |

POSTAL SAVINGS SYSTEM — UNITED STATES OF AMERICA
NOT TRANSFERABLE — NOT NEGOTIABLE
WASHINGTON, D.C.   FEB.18,12   56327   128409
DEPOSITORY OFFICE   DATE OF ISSUE   CONSECUTIVE NUMBER   ACCOUNT NUMBER
54286
OFFICE NUMBER           CERTIFICATE OF DEPOSIT   *John Doe*
                                                    NAME OF DEPOSITOR THIS CERTIFIES THAT THE SUM OF  $ 56  HAS BEEN DEPOSITED WITH THE BOARD OF
TRUSTEES OF THE POSTAL SAVINGS SYSTEM AND
INTEREST BEGINS ON THE   WILL BE PAYABLE TO THE DEPOSITOR AT THE ABOVE NAMED   ISSUE OF 1912
FOLLOWING DATE           DEPOSITORY OFFICE WITH INTEREST AT THE RATE OF TWO
MAR.1,12.                PER CENT PER ANNUM PAYABLE ANNUALLY ON THE PRESEN-   SERIAL NUMBER
                         TATION OF THIS CERTIFICATE PROPERLY ENDORSED         563279834

---

| 100 | ○ | 90 | 80 | 70 | 60 | ○ | 40 | 30 | 20 | 10 | 0 | | 9 | 8 | 7 | ○ | 5 | 4 | 3 | 2 | 1 | 0 |

POSTAL SAVINGS SYSTEM — UNITED STATES OF AMERICA
NOT TRANSFERABLE — NOT NEGOTIABLE
WASHINGTON, D.C.   FEB.18,12   56327   128409
DEPOSITORY OFFICE   DATE OF ISSUE   CONSECUTIVE NUMBER   ACCOUNT NUMBER
54286
OFFICE NUMBER           CERTIFICATE OF DEPOSIT   *John Doe*
                                                    NAME OF DEPOSITOR THIS CERTIFIES THAT THE SUM OF  $ 56  HAS BEEN DEPOSITED WITH THE BOARD OF
TRUSTEES OF THE POSTAL SAVINGS SYSTEM AND
INTEREST BEGINS ON THE   WILL BE PAYABLE TO THE DEPOSITOR AT THE ABOVE NAMED   ISSUE OF 1912
FOLLOWING DATE           DEPOSITORY OFFICE WITH INTEREST AT THE RATE OF TWO
MAR.1,12.                PER CENT PER ANNUM PAYABLE ANNUALLY ON THE PRESEN-   SERIAL NUMBER
                         TATION OF THIS CERTIFICATE PROPERLY ENDORSED         563279834

Witnesses
*Harry W. Lindsey Jr.*
*H. F. Sadgebury*

Inventor
*John A. Werner*
by *R. C. Kloss*
*Chester H. Braulton*
Attorneys

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

ACCOUNTING-MACHINE.

1,233,528. Specification of Letters Patent. Patented July 17, 1917.

Application filed October 6, 1913. Serial No. 793,513.

*To all whom it may concern:*

Be it known that I, JOHN A. WERNER, a citizen of the United States, residing at Dayton, in the county of Montgomery and State of Ohio, have invented certain new and useful Improvements in Accounting-Machines, of which I declare the following to be a full, clear, and exact description.

This invention relates to accounting machines and has more particular relation to machines used for perforating certificates of deposit or other classes of record materials issued in duplicate or triplicate, to record thereon the amount entered on the accounting device as well as printing on the record material this amount together with other data.

The machine in the illustrative form shown herein is peculiarly adapted to use in the United States Postal Savings System for perforating the original certificate of deposit and duplicates thereof, to record thereby, the amount deposited, and also to print on each original and duplicate the amount and other information such as the account number of the depositor, the date of issue, etc. The accompanying drawings show the invention in the preferred form applied to this particular use but it is to be understood that it is not intended to limit the invention to use in the United States Postal Savings System, as it is equally well adapted for use in the postal savings systems of foreign countries and for employment in similar systems in which a certificate, slip, voucher, check, ticket, receipt or other record materials and duplicates are used. For example, a machine embodying the present invention may be designed for perforating and printing certificates of deposit and duplicates issued by building and loan associations or banks and also for printing and perforating sales slips or account tickets used by mercantile establishments carrying on a cash and credit business to record the cash paid or the amount of credit extended.

The invention in the present illustrative form is shown applied to a machine adapted to indicate by perforations the amount deposited and printing the amount and other data on the original certificate of deposit and two duplicates, those shown in the drawings being somewhat similar in form to the certificates now being issued by the Government. It is intended that the original certificate of deposit should be given to the depositor and that one of the duplicates be retained as a record by the postmaster of the post office issuing the certificates, while the other duplicate is to be filed with the Postmaster General in Washington. It is to be understood that the machine can be readily designed to print and perforate the original certificate of deposit and but one duplicate if so desired.

As a variety of records, six in the present preferred form, are to be made both on the original certificate and the duplicates, it is evident that in writing these records on the original and duplicates, the clerk is liable through human fallibility to make a mistake or to falsify one or more of the records with fraudulent intent. In either case there would be a variance between the original and one or both of the duplicates which might lead to confusion in the filing of the duplicates by the postal authorities or in the auditing of the amounts deposited, as well as make defalcation by the postal clerk, without immediate detection possible. A forgery on the part of the depositor or of the clerk can also be more readily perpetrated by changing written records than by changing printed records and by perforating the certificates to also record by perforation the amount printed, the possibility of forgery is practically eliminated as it is impossible to alter the printed record without discovery as the difference in the amount shown by the perforations and the amount printed would be detected readily. Of course, it is possible for the certificates to be perforated by a hand punch but such a process would be slow and difficult and the clerk could still intentionally falsify the records or inadvertently make a mistake.

It may then be said that the main object of this invention is to construct a machine which perforates and prints data at a single operation of the machine on record materials such as certificates of deposit and duplicates thereof, so that the issuance of the certificates in final form requires the consumption of but little time and renders the certificates more legible and also practically eliminates the possibility of error, intentional falsification or forgery. In order to make the auditing of the amounts deposited easier and protect the Government from misappropriation by its clerks of the money deposited, an accounting device in the preferred form is employed to accumulate the amounts printed at each operation of the machine.

In the accompanying drawings the invention is shown as applied to the type of machine shown and described in Letters Patent of the United States No. 980,201, granted to T. Carroll, January 3, 1911 but it is to be understood that it is shown applied thereto for illustrative purposes only, as the invention is equally well susceptible of use in accounting machines of other types.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Of said drawings:—

Fig. 3 is a transverse vertical section through the machine being taken just to the left of the hundreds amount setting lever and looking toward the right.

Fig. 4 is a detailed view showing the impression means for the printing mechanism with one of the guide plates for the certificates removed for the sake of clearness.

Fig. 5 is a detailed sectional view through a frame employed to guide the plates carrying perforating punches.

Fig. 6 is an enlarged detailed front view of the perforating mechanism looking at right angles at the plates carrying the punches.

Fig. 7 is a detail of a cam employed to actuate alining devices for the perforating punches and also to operate the consecutive numbering counter.

Fig. 8 is a detail of a cam employed to actuate the impression means of the printing mechanism.

Fig. 9 is a transverse vertical section taken just to the right of the central frame 13 shown in Fig. 1, and looking toward the right in said figure.

Figs. 10 and 11 are front views of the printing type and indicating wheels, Fig. 11 being broken away from near the right side of Fig. 10.

Fig. 12 is a detail view of the consecutive numbering counter, showing the mechanism for actuating the same.

Fig. 13 is a plan view of one of the forms of certificates and duplicates employed in connection with this machine.

Figure 1:
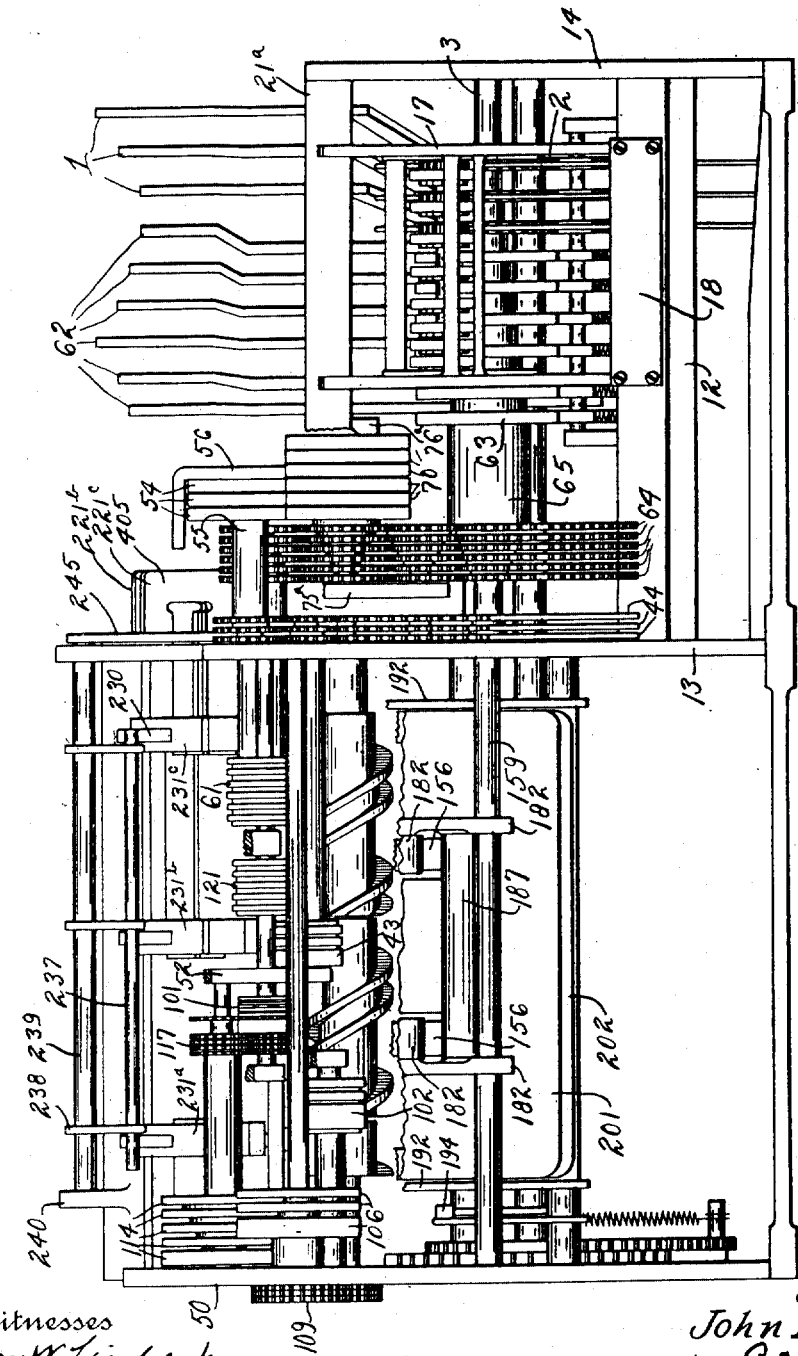
Figure 1 is a front elevation of the machine on a reduced scale showing the invention applied thereto, parts of the same being broken away to expose some of the mechanism more clearly to view.

As shown in Fig. 13 of the drawings, six different records are to be made by the printing mechanism and one by the perforating mechanism on the original certificate and two duplicates. It is apparent, however, that any number of records can be recorded as determined by the postal authorities. These six records include the amount deposited, the account number of the depositor, the consecutive number of the certificates, date of issuance of the certificates with the name of the city in which the office is located, and the date from which the certificates are to bear interest, while the perforating mechanism records the amount by punching holes through numerals arranged on the certificates. Preparatory to the operation of the machine, the certificates are placed on the proper table for that purpose and levers in the preferred form of embodiment shown are manually operated, the levers being constructed through the medium of gears and sleeves to set up the amount deposited and the account number of the depositor, on corresponding sets of printing type carriers. The type carriers employed for recording the date of issue and the date from which interest is to begin are also manually adjusted and this is accomplished by any suitable means such as turn buttons. Indicators are properly connected to each of the sets of type carriers so that the operator can adjust the setting levers and date printing wheels until the indicators show the proper indications. The consecutive numbering device is constructed to be advanced one step at each operation of the machine, while the type from which the office number of the post office issuing the certificates is taken are mounted in a stationary block, as this number for each office is always the same.

The amount levers when adjusted also differentially rotate a shaft and nested sleeves equipped with spiral cams which position and carry punches so that the punches are brought into register with numerals arranged in a line across the top of each certificate, the amount represented by the numerals with which the punches are brought into register being the same as the amount set up on the amount type carriers. The setting levers for positioning these amount type carriers and the perforating punches also position suitable actuating racks for the totalizer. Upon operation of the machine the totalizer is drawn over the racks in their differentially set positions, whereby the amount printed is entered on the totalizer. Impression means for forcing each original certificate and its duplicates against the type carriers whereby the six above enumerated records are printed on the certificates is actuated three times at a single operation of the machine for this purpose, the feeding means being constructed to feed the certificates and duplicates into proper position after each impression. Simultaneously with the actuation of the impression means the punch pins of the punches are moved to coöperate with their respective dies to punch holes through the numbers at the top of the certificates in register with the punches.

Having outlined the general operation of the machine, a detailed description of the various mechanisms will now be given.

As certificates evidencing deposits are not issued in denomination greater than $100.00 and denominations less than a dollar are not considered but three amount levers (Fig. 1) are provided in the illustrative form. The units of dollars and the tens of dollars levers are adapted to be given nine extents of movement from zero but the third lever can only be moved from zero position to the 100 mark on the index (not shown) on cabinet and opposite the lever. The setting and registering mechanisms of the machine are clearly illustrated in Fig. 3 and by reference to this figure it will be seen that each of the amount setting levers 1 is connected to a disk 2 which is journaled upon a transverse shaft 3. Each of the disks 2 is formed with rack teeth 4 and is provided with V-shaped locking notches 5 in the lower portion of its periphery. The gear teeth of the disk are at all times in mesh with the rack teeth 6 upon the rear edges of three vertical sliding rack bars 7, these bars having also formed upon their front edges rack teeth 8 with which the counter pinions 10 coöperate. The rack bars 7 are mounted in suitable slotted guide boxes 9 formed in the forward end of a frame 12 which is mounted between the central vertical frame 13 and a right hand side frame 14 of the machine whereby they are held in accurate vertical positions. It will be seen from the above that these registering bars will always occupy positions having the registering valuation corresponding to the positions of their setting levers 1. Thus if one of the levers is moved to a position representing $5.00 on the scale plate (not shown), its corresponding rack bar would be moved to a position in which five of its rack teeth 8 would be brought into the regular operating path of the particular pinion of the counter wheel corresponding to the denominational value of the bar operated.

The connections between the main drive shaft 11 and the movable counter 15 are such that the counter is first moved downward over the rack teeth 8 to actuate the counter wheels, then disengaged from said teeth and moved back to its normal upper position. During the return movement of the counter the counter wheels are not in engagement with the rack teeth and during this time the transfer is effected. The counter and the means for moving the same are fully shown and described in the aforesaid Letters Patent granted to T. Carroll and reference for a full description can be had thereto. A brief description of same, however, will be given here.

The counter complete is supported in and carried by a frame 16 which has two anti-friction rollers (not shown) upon each end. The counter frame carrying the counter is vertically slidable within the rock frame which is formed on two parallel vertical side arms 17 which are connected at their lower ends by a tie bar 18. The inner side of each vertical side arm has formed therein a slide way or channel 19. The anti-friction rollers of the counter frame 16 run in these slide ways and in this manner the counter is guided vertically in its reciprocations. A cross shaft 20 passes through bearings formed in the upper ends of the side arms 17 whereby the rock frame carrying the counter may be swung a limited distance toward the rear and back again to normal position shown in Fig. 3.

The machine is arranged when operated first to swing the counter a short distance toward the rear in order to bring the teeth of the counter pinions 10 in a vertical line with the registering rack teeth 8. The counter is then moved downward so as to pass over the registering rack teeth and thereby be operated. Third, the counter is swung toward the front of the machine out of engagement with the registering rack teeth and finally the counter is moved upward to its normal position. The means for giving the counter a vertical movement is not shown in the accompanying drawings but a complete description of this means can be had in the aforesaid patent. The means for swinging the counter forward and backward, however, is shown in Fig. 3. This means includes a pitman 21 connected to one of the side frames 17 of the counter rock frame by a pin 25. The rear end of the pitman is forked and straddles the main drive shaft 11 and also carries an anti-friction roller 22 which plays in a cam groove 23 formed in the face of a disk 24 rigidly mounted on the drive shaft 11. The construction of the cam groove is such that as soon as the operation of the machine is started, the counter rock frame is swung toward the rear to bring the counter pinions into alinement with the registering rack teeth as heretofore described. It is held in this position while the counter frame is moved downward and is then moved out of engagement with the rack teeth and toward the front and thus held out of engagement during the remainder of the operation of the machine.

The transfer mechanism for the registering device is also shown in Fig. 3 and will be described briefly here. Transfer pawls 26 coöperate with the counter wheels and are pivoted at their lower ends to the rear ends of transfer levers 27, each of which is pivoted about midway of its length upon a cross shaft 28 which is supported at its ends in the counter frame. At its front end each of the pawl carrying levers carries an anti-friction roller 29. During the return movement of the counter, that is while it is being swung upward to normal position, the anti-friction rollers 29 contact with fixed transfer cams or projections 31 which are rigidly mounted near the front of the machine as described in the aforesaid patent. Upon engagement of the rollers with the cams the front ends of the levers 27 (to the right in Fig. 3) are swung downward and the rear ends are swung upward against the tension of the springs 32 which connect the pawl carrying levers and the trip pawls 33. The trip pawls 33 as usual are employed for holding the transfer pawls in their inoperative positions so that the transfer pawls will not engage the pinion gears. Each of the trip pawls holds the transfer pawls in inoperative position by reason of the normal engagement of a projection 35 on the transfer pawls with one of two notches 36 formed on the rear end of each trip pawl. When a trip pin 37 projecting from the counter pinion engages an operating nose 38 of the corresponding trip pawl, the rear end of trip pawl will be swung downward against the tension of the spring 32 and permit the transfer pawl for the next higher totalizer pinion to swing toward the ratchet wheel 40 under the impulse of a spring 39 until the arm 35 drops into the second notch of the trip pawl. The tripping action brings the upper operating end of the transfer pawl into such position that the transfer pawl will turn the registering wheel of the next higher denomination one notch when its respective lever 27 is operated as before described. Coöperating with the ratchet wheels 40 are the usual spring pressed retaining pawls 41 to prevent retrograde movement of the registering wheels.

The five left-hand registering wheels of the counter (Fig. 1) are not actuated directly by the registering racks and receive movement only as it is transmitted to them from the hundreds of dollars registering wheel as described in the above mentioned patent.

Figure 2:
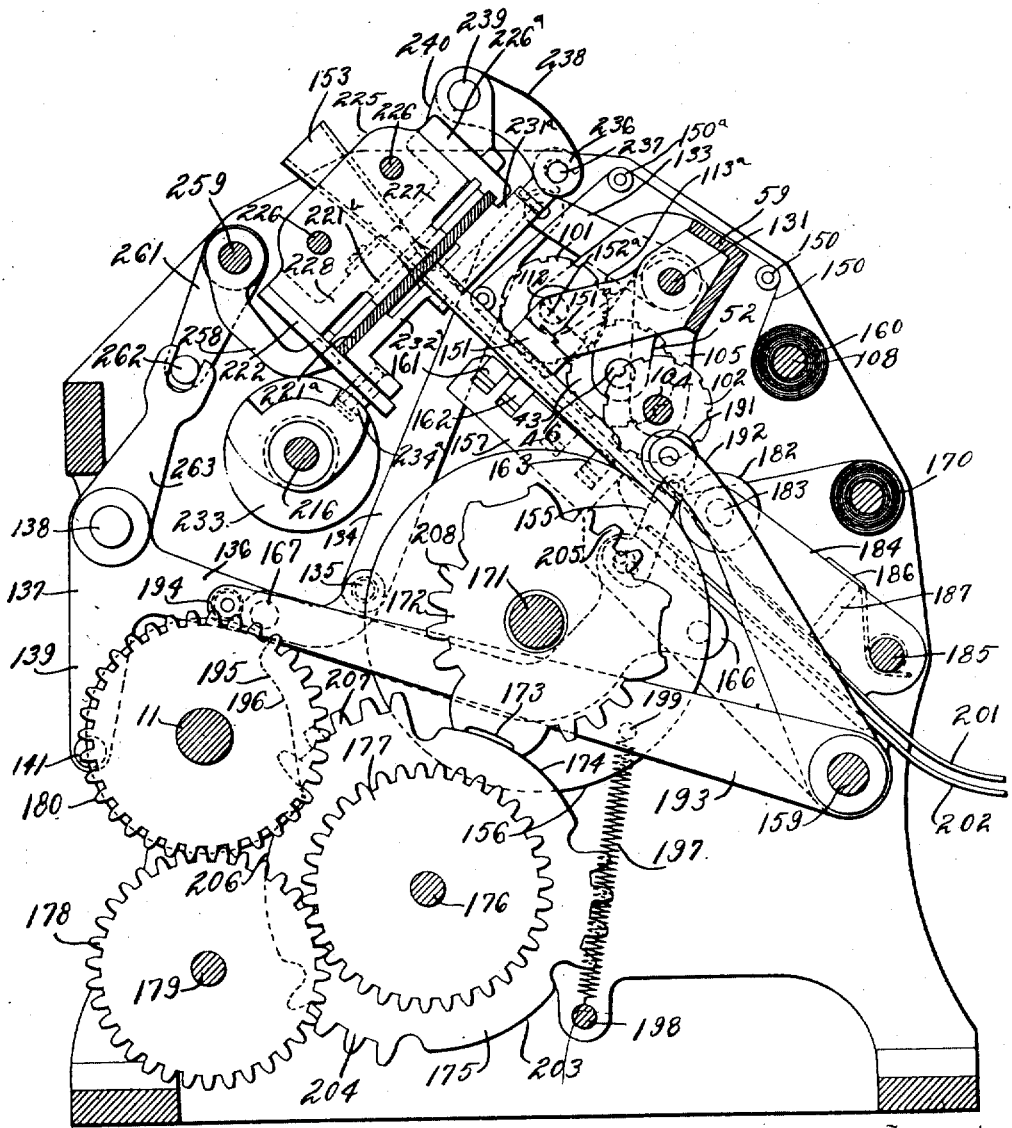
Fig. 2 is a transverse vertical section taken just within the left hand frame of the machine and looking to the right.

As shown in Figs. 1 and 10 there are three amount or value printing wheels 43 and these are connected with the amount setting levers 1 as follows. The units of dollars actuating plate 2 is rigidly mounted upon the pivot shaft 3. A units of dollars driving segment 44 (Figs. 1 and 9) is secured upon this shaft and is always in mesh with the left hand end pinion 45 rigidly mounted upon a sleeve 46 surrounding a shaft 47, the units of dollars printing wheels being fast to the other end of this sleeve (Figs. 9 and 10). In a like manner the tens of dollars and the hundreds of dollars actuating plates are fast to their respective actuating segments 44 by nested sleeves 48 surrounding the pivoted shaft 3. The hundreds of dollars printing wheel which bears a "zero" and "one" mark is rigidly mounted on the other end of this shaft. The tens of dollars actuating segment 44 meshes with the corresponding or intermediate pinion 45 rigidly mounted on a sleeve to the other side of which the tens of dollars type wheel is rigidly fastened. The shaft 47 is mounted in suitable bearings in a central frame 13 of the machine and in an arm 52 projecting from a frame 59 (Figs. 2 and 10). The frame 59 which is supported near the top and front of the machine by the central frame 13 and the left hand end frame 50, is right angled in form and has other depending arms for supporting shafts which carry the various sets of type carriers as will be described.

For convenience in setting the adjusting levers 1 small indicators 54 shown in Figs. 1, 9, and 11 are provided. The indicator wheels are rigidly mounted on sleeves 55 surrounding the short shaft which is supported at its left and right ends respectively by suitable bearings in the central frame 13 and sub-frame 56 fastened to the central frame as shown in Figs. 9 and 11. The other end of the sleeves from that supporting the indicators 54, carry gear wheels 57 which mesh with the corresponding gear wheels 45 on the value printing wheel shaft and sleeves above mentioned. It results from the construction just described that movement or adjustment of the amount setting levers directly and correspondingly move the indicators 54 and the value printing wheels 43. The indicators therefore form a convenient means for ascertaining if the value type carriers have been properly adjusted so as to register and record the desired amount, because the operator can simply adjust the levers until the indicator shows the amount desired to be registered and can then be certain that the subsequent turning of the main drive shaft 11 will cause that desired amount to be registered and recorded.

As stated above, the machine is adapted to print the account number of the depositor upon the original certificate and the duplicates, and type carriers 61 (Figs. 1 and 10) provided for this purpose are set up in a manner similar to the type wheels to record the amount. Six levers 62 are provided for this purpose and in a manner similar to the amount levers 1 are mounted upon disks or plates 63 (Figs. 1 and 9). These plates are constructed similarly to plates 2, Fig. 3, except that they are not provided with actuating teeth 4 as, of course, no counter actuating racks 7 are to be positioned differentially by the levers 62. The plates 63 are rigidly connected to corresponding driving segments 64 by sleeves 65 (Fig. 1) surrounding the sleeves to which the amount levers are connected. Each of these driving segments 64 mesh with corresponding gear wheels 66 (Figs. 1, 9, and 11). These latter gear wheels are rigid with sleeves 67 (Fig. 9) surrounding the shaft 68 which is supported at one end by the sub-frame 56 and at the other end by an arm 70ª which projects rearward from the bar 59 as best shown in Fig. 12. The type carriers 61 employed to record the account number are rigidly mounted on the left hand ends of these sleeves.

Set screws 62ª (Fig. 9) normally engaging actuating driving segments 44 and 64 and carried by arms 63ª which project from the frame 12, are adapted to be adjusted so that the home position of driving segments may always be controlled accurately regardless of wear in the parts serving to normally stop these elements and the levers in home positions.

Indicators 70 (Fig. 9) are also employed to indicate the account number set up on the type wheels 61 and these indicators are also set up by levers 62. The actuating segments 64 driven by the account number levers, as described mesh with corresponding gear wheels 72 (Figs. 4 and 9). These wheels in turn mesh with gear wheels 73 rigidly mounted on a shaft 100 and therefore sleeves 74 surrounding shaft 100 and corresponding indicators 70 are also rigidly fastened to this shaft and the sleeves. The shaft 71 upon which the gear wheels 72 are loosely mounted is carried by arms 75ª and 76ª projecting downwardly from the bar 21ª which supports the counter frame 17. From the above construction it results that movement of the account levers 62 directly and correspondingly moves the account member indicators 70 and the account member type wheels 61 in a manner similar to the movement of the amount indicating wheels and type wheels by the amount levers 1.

In order to prevent the operation of the machine with all of the amount setting levers in normal zero position, the outer end of a locking arm 80 rigidly mounted near the right hand end of a shaft 81 is normally in the path of a pin 80ª projecting laterally from the disk 24 on the drive shaft 11 (Fig. 3). The shaft 81 (Figs. 2 and 3) which is supported at one end by an arm 81ª (Fig. 9) projecting from bar 82ª connecting the central frame 13 and end frame 14 of the machine, carries two arms 82 (Figs. 3 and 9) fast thereto. A tie bar which connects these two arms at their lower ends, is provided with a series of anti-friction rollers 84 normally in contact with the walls of notches 85 formed in the rearward portion of the periphery of each of the amount plates 2. When any one of the levers 1 connected to one of these plates is positioned, the arms 82 are cammed rearward and will thus move the arm 80 (Fig. 3) at the right hand end of the shaft 81 out of the path of the pin 80ª on the disk 24 to permit operation of the machine.

For the purpose of causing the setting levers, 1 and 62, to stop always at a point directly opposite some numeral upon the index plates (not shown) fast to the cabinet and for the further purpose of locking the levers and the parts controlled thereby against adjustment during an operation of the machine, a series of locking or alining pawls 87 (Fig. 3) are pivotally mounted upon the transverse shaft 88 supported by ears 90 projecting vertically from the frame 12. These pawls are of bell crank formation and the forward end of each is formed into a wedge shaped upturned nose 89 which coöperates with the V-shaped notches 5 of their respective plates 2 and 63. The downward turned rear ends or tails 93 of these pawls extend in front of a cross bar 90ª of a locking frame 91 which is pivotally mounted upon the shaft 88. The frame 91 is provided with a series of set screws 92 which coöperate with the tails 93 on the pawls 87 for adjusting the relative positions of the two parts. Coiled springs 94 are mounted between the arms 87 and the frame 12 to yieldingly force the pawls to bring their noses into engagement with the V-shaped notches 5. The locking frame 91 is provided with an anti-friction roller 95 adapted to coöperate with the locking disk 24 fast to the main drive shaft 11. The disk is formed with a notch 96 normally in such position that the roller 95 is freely movable therein to permit rocking of the frame 91 upon movement of an amount or an account number setting lever. As soon, however, as the machine is operated, the rotation shaft 11 is moved far enough to present the solid periphery of the disk 24 in the path of the locking roller 95 so as to make it impossible to swing the alining nose 89 of any pawl 87 out of engagement with its alining notch until the operating mechanism of the machine including the disk 24 has been returned to normal position.

In order to print upon the original certificate and the duplicates the day of the month, the month, and the year upon which the money was deposited and also to print the date upon which the interest on the amount of the deposit begins to run, date printing wheels 101 and 102, respectively are provided as shown in Fig. 10. The date printing wheels 102 for printing the date upon which interest begins are shown in this figure as being adapted to print only the first day of the month together with the year as under the Postal Savings Act of the United States interest is always to begin from the first day of the following month. These type wheels 102 are mounted on the right hand ends of suitable sleeves 103 which turn on the shaft 104 suitably mounted in and between the side frame 50 of the machine and an arm 105 (Fig. 10) projecting from the frame 59. Indicators 106 (Fig. 10) are provided to enable ascertaining by the operator the positions at which the type wheels 102 stand. These indicator wheels are mounted on short sleeves 107 surrounding the left hand end of the shaft 108 which is supported by the side frame 50 and central frame 13. Upon the ends of the sleeves 107 and 103 which extend through to the outside of the frame 59 and on the left side of the machine frame are intermeshing gear wheels 109 and 111, respectively and through these when the indicators are adjusted to indicate a certain month and year, the same month and year will be at the printing line of the type carriers 102.

The date wheels 101 for recording the date of issuance of the certificates are fastened to short sleeves revoluble around a shaft 112, which is carried by the arm 70ª supporting the left end of shaft 68 and an arm 113 which also projects from the bar 59. The corresponding indicators 114 (Fig. 10) for these type carriers are rigidly mounted on the left end of sleeves 115 adapted to turn on a shaft suitably mounted in bearings in the arm 52 at its right end and the side frame 50 at its left end. At the right hand end of each of these sleeves is fast a gear 117 meshing with gears 118 supported by the left end of short sleeves surrounding the shaft 112 and carrying at their right ends corresponding date of issue type wheels so that movement of the indicators 114 will turn the type carriers 101 corresponding extents.

The means for adjusting the above described indicators and type wheels are not shown but it is apparent that any means can be employed, as for example, the device shown and described in the aforesaid patent, or they may be adjusted by a direct contact of the fingers of the operator with the indicating wheels.

Besides the amount, account number and date printing wheels, type wheels 121 are provided to consecutively number the original certificate and the duplicates which receive the same number as the originals. These type wheels are loosely mounted upon the right hand end of the shaft 112 which carries the date of issue type carriers, and as shown in Fig. 10 the right hand end of this shaft is loosely mounted in the same bearing 70ª as is the left hand end of shaft 68 carrying the account number printing type, so that the consecutive numbering type wheels, the account number type wheels, and the type wheels for printing the date of issuance of the certificates are in alinement with each other. As shown in Fig. 12, these consecutive numbering wheels are provided with ratchets 123 which are engaged by operating fingers 124 of a multi-prong pawl 125. This multi-prong pawl is carried by a pivoted yoke 126 which is journaled upon the shaft 112. A link 127 is pivoted by a pin 128 to the right hand side of the yoke and the other end of the link is pivoted at 129 to the outer end of an arm 130 which is fast upon a shaft 131 suitably mounted in the side frame 50 and central frame 13 and passing through holes in the arms 52, 105, 113, and 113ª projecting from the bar 59. When the shaft 131 is rocked, the consecutive numbering wheels are advanced one step at each operation of the machine, as the pawl is first moved rearward so that one of the fingers will engage a shoulder 132 on the next rearward ratchet tooth so that when the pawl is returned to normal position near the end of the operation of the machine the numbering wheel engaged by its finger will be moved one step in position to print a new number at the next operation of the machine. The means for rocking this shaft 131 to actuate the numbering wheels is shown in Figs. 2 and 8. An arm 133 fast to the right hand end of shaft 131 is pivotally connected at its outer end to a link 134 which at its lower end is connected by a pin 135 to an arm 136 of a three pronged member 137. This member 137 is pivotally mounted on a stub shaft 138 projecting from the left hand side of the central frame 13 of the machine. As shown in Fig. 8, a downwardly extending arm 139 of this three prong member bears an anti-friction roller 141 which plays in a cam groove 142 formed in the face of a disk 143 rigidly mounted upon the main drive shaft 11. This cam groove is so shaped that at the beginning of each operation of the machine, the three pronged member 137 is rocked clockwise as viewed in the drawings. This rocks the shaft 131 and yoke 126 counter-clockwise and moves the pawl 124 to engage the next ratchet tooth behind so that upon return movement of the three pronged member to normal position near the end of the operation by the cam 142, the consecutive numbering wheels have "one" added thereon by the engagement of the pawl 125 with the ratchet wheel. A series of spring pressed pawls 145 (Fig. 12) are loosely mounted upon the shaft 131 and at their forward ends are notched to engage shoulders 146 formed on the ratchet wheels 123 to prevent any retrogade movement of the consecutive number wheels. These pawls are held in engagement with the wheels by means of springs 147 which are seated in a projecting portion 132 of the frame 59 and backed by the pawls.

As stated before, the machine is also designed to print on the original certificates and the duplicates, the name of the city and office number of the post office issuing the certificates. As this name for each city and for each office is always the same for any particular machine the printing type for this information are formed on the lower face of a block 151 (Figs. 2 and 10) which has a dovetailed projection 151ᵃ on its upper face for engaging in a groove in the lower face of a bar 152ᵃ. The bar 152ᵃ is rigidly connected to the lower ends of the arms 113 and 113ᵃ both of which project from the frame 59.

In actual use before the machine is operated the attached original and duplicates which have had the name of the depositor written on by the postal clerk are placed original first in an inclined table or chute 153 (Figs. 1 and 2). As shown in Fig. 13, the spaces between the original certificate and the duplicates is perforated so that they can be easily detached from one another after they have been printed. The original and duplicates are permitted to slide down the chute 153 until the lower edge of the original which is the foremost certificate rests against arms 155 (Fig. 2). There are four of these arms each of which is rigidly mounted on the side of one of four feeding disks 156 (Fig. 4). The distance between the sides of the table or chute is just sufficient to permit insertion of the certificates and prevent lateral movement of the certificates. The top and the bottom of the mouth of the chute 153 are inclined to each other so that the certificates can be more easily inserted. The inner portion of the chute has no top and the bottom has openings to permit the platens which will be presently described, to force the certificates upward against the printing wheels.

The inking ribbon 150 for the type carriers passes from the supply roll 170 under the various type carriers about the guide rollers 150ᵃ to the storage roll 160. No means is shown in the drawings for feeding this inking ribbon as such means is not necessary to the understanding of the invention and any of the well known forms of inking mechanism may be employed.

The impression mechanism for carrying the certificates into contact with the type carriers is shown in Figs. 2 and 4. Two platen carrying arms 157 and 158 are loosely mounted on a shaft 159 as shown in Fig. 4 and are constructed to be freely movable between the feeding rollers 156. The left hand platen carrying arm 157 carries platens 161, 162 and 163 for respectively forcing the certificates into engagement with the type carriers 101 for printing the date of issuance, the type on the block 151 for printing the office number, and the type carriers 102 for printing the date upon which the interest is to begin. Platen carrying arm 158 carries platens 164 and 165, the platen 164 being adapted to raise the certificates against the consecutive number-type carrier 121 and the account number type carriers 61, while the platen 165 raises the certificates against the amount type carriers 43.

These platens are given a triple movement upon each operation of the machine to print this data upon the original and each of the duplicates, feeding mechanism being provided to advance the duplicates into a printing position after each actuation of the platen carrying arms. Each of the platen carrying arms 157 and 158 has rigidly mounted thereto a dependent arm 166 (Figs. 2 and 4). These arms extend downwardly and rearwardly at their rear ends and carry antifriction rollers 167 which play in cam grooves 168 (Fig. 7) formed in the faces of disks 169 which are rigidly mounted upon the main drive shaft 11 one near the frame 13 and the other near frame 50. The shaft 11 is given one complete rotation at each operation of the machine through the medium of a gear 180 (Fig. 2) meshing with a gear 178 which is rotated by a crank handle or motor as desired but these are not shown. As shown these cam grooves 168 are so designed as to raise the platen carrying arms first against the original and then against each duplicate in order to print the same data enumerated above upon each of them.

The feeding means for the certificates advances, after each impression, a duplicate of the original into printing position and this means is shown in Fig. 2. Rigidly mounted upon the shaft 171 fast to which are the feeding disks 156 is a mutilated locking gear 172 having three locking portions 173, one of these locking portions being normally in engagement with a portion 174 on the periphery of a coacting mutilated locking gear 175. This latter locking gear is fast to a shaft 176 and has rigidly mounted on its side a gear wheel 177 constantly in engagement with the gear wheel 178 above mentioned as rotatable by the crank or motor. These locking gears are so constructed that after the platen carrying arms 157 and 158 have been raised to force the original certificate against the various sets of type wheels, the locking portion 174 of the locking gear 175 slides out of normal locking position with the locking coacting portion 173 on the gear 172 and as the shaft 176 is being rotated in a counter clockwise direction the set of four teeth 181 on the locking gear 175 engages the three teeth 182ª of the locking gear 172 so that the shaft 171 and therefore the feeding disks 156 are given nearly a one third rotation. Such movement of the feeding disks 156 carries the arms 155 fast to the feeding disks away from the lower edge of the original certificate to permit at the same time the feeding disks 156 and the coacting feeding rollers 182 to feed the certificates forward the length of one certificate.

There are two of these feeding rollers 182 (Figs. 1 and 2) each of which is in engagement with one of the two inside feeding disks 156 and they are mounted on pins 183 at the rear ends of arms 184 loosely mounted upon a shaft 185. One end of a spring 186 which is coiled about the shaft 185 extends over a tie bar 187 connecting the two arms 184 to yieldingly hold the rollers into engagement with their coacting disks 156 the other end of the spring being fastened in front of the shaft 185 to one of the arms 184.

As the rollers 156 and 182 contact with each other slightly in front of the normal position of the arms 155 carried by the disks 156, an auxiliary feeding means is provided to feed the certificates forward from the position in which they engage the rear sides of the arms 155 until the original certificate passes between the coacting feeding disks 156 and rollers 182. To this end two auxiliary feeding rollers 191 are loosely mounted on arms 192 and these arms are rigidly mounted upon the shaft 159 (Figs. 1 and 2). Fast to the left hand end of the shaft 159 is an arm 193 which at its rear end carries an anti-friction roller 194 riding on the periphery of an open cam 195 having a cut away portion shown in dotted lines (Fig. 2). This cam is nearly circular except for the cut away portion 196 and is just back of gear 180 in Fig. 2. After an impression from the printing wheels is taken on the original certificate from the type carriers, the cut away portion 196 of the cam rotating counter clockwise in Fig. 2 passes under the roller 194 to permit a spring 197 connected at one end to a pin 198 projecting from the side frame of the machine and at the other end to a pin 199 projecting from the arm 192, to rock the shaft 159 counter clockwise and in this way lower the rollers 191 into engagement with the two outside ones of the four feeding disks 156. After the original certificate has passed between the two outer feeding disks 156 and rollers 182, the open cam 195 forces the arm 192 to normal position so that the rollers 191 are raised out of engagement with their feeding disks 156 during the rest of the operation of the machine. Plate 201 (Figs. 1 and 2) mounted on the lower side of the arms 184 and plate 202 carried upon the upper side of the platen carrying arms 157 and 158 form a chute to guide the certificates as they pass from between the feed disks 156 and rollers 182 to the exterior of the machine.

After the first duplicate has been fed into printing position, the second locking portion 173 of the locking disk 172 engages the locking portion 203 of the periphery of the locking gear 175 to lock the feeding rollers 156 against movement while these locking portions are in sliding contact during which time an impression is being taken upon the first duplicate certificate, after which the teeth 204 on the locking disk 175 engage the three teeth 205 of the locking disk 172 so that the second duplicate certificate is fed into printing position after which the third locking portion 206 of the locking disk 175 is brought into sliding and locking engagement with the third locking portion of the locking gear 172 so that the certificates are held from movement during the printing of the second duplicate. The certificates are finally fed forward out of the machine by the engagement of the five teeth 207 on the locking disk 175 with the coöperating teeth 208 upon the locking disk 172. The five teeth 207 coöperate with the teeth 208 to feed the certificates farther than they are fed between impressions so that the original projects beyond an opening in the cabinet to permit withdrawal of the certificates from the machine by the fingers of the operator. The final movement of the operating mechanism brings the locking portion 174 of the locking disk 175 into normal locking engagement with the first locking portion 173 of the disk 172.

As shown in Fig. 13 numerals are arranged in a single row across the top of each original and duplicate. These numerals are arranged in three series or groups, the first group on the right representing the units of dollars, the next group representing the tens of dollars and the third group, the hundreds of dollars. This third group includes only two numbers, a "0" and "100", as one hundred dollars is the largest denomination in which the certificates are issued, under the United States Postal Savings laws but the machine in the form shown is adapted to issue certificates in valuations as great as $199.00 by punching holes through the "9" in the units series, "90" in the dollars series and "100" in the hundreds series.

Punches are provided for punching holes through the numerals in all of these series to record in such a manner the amount recorded by the printing mechanism and the means by which these punches are controlled and operated will be now fully described.

Referring to Figs. 1, 6 and 9, it can be readily seen that the driving segments 44 which are differentially positioned by the amount setting levers, as has been described, mesh with gear wheel 215. The units of dollars driving segment 44 meshes with the left hand gear wheel 215 (Fig. 6) which is fast to an outer sleeve 217 revolubly mounted around a shaft 216 which is suitably supported by the central frame 13 and the side frame 50 of the machine. The sleeve is enlarged in diameter at 209 and is provided with two spiral flanges 210 which form a spiral groove 211 passing from one end of the enlarged portion of the sleeve to the other. The tens of dollars driving segment 44 engages the middle gear 215 which is fast to a sleeve also revolubly mounted upon a shaft 216 between the shaft and the outer or units of dollars sleeve to which the left hand gear 215 is rigidly fastened. The sleeve to which the middle gear 215 is fast also has an enlarged portion 212 which is to the left and similar to the enlarged portion 209 on the outer sleeve, and is also provided with a similar cam groove 211. The hundreds of dollars driving segment meshes with the right hand gear which is fast to the shaft 216. The spiral cam groove 219 formed on the enlarged portion 233 of the shaft 216 is much shorter than the spiral cams on the sleeves as this cam is adapted to be given but one extent of movement from normal position by the hundreds of dollars amount lever. It will readily be seen from this construction that the spiral cams are rotated directly and differentially through the amount levers and the manner in which this differential movement of the cam bring punches into position to punch holes through the proper numerals at the top of the certificates will now be taken up.

Three plates $221^a$, $221^b$, and $221^c$ for the hundreds of dollars tens of dollars and units of dollars series of numerals respectively are U-shaped in form (Figs. 1, 2 and 6). The arms 400 and 401 of the hundreds of dollars plate $221^a$ (Figs. 1 and 6) extend toward the right and are integral at their left hand ends with the connecting portion 402. The free ends of arms 403 and 404 of the tens of dollars plate $221^b$ extend toward the left and at their other ends are connected by the portion 405 (Fig. 1) and the free ends of arms 406 and 407 of the units of dollars plate $221^c$ are shorter than the arms of the tens of dollars plate but extend in the same direction. These plates are slidably supported by a frame 224 (Figs. 2, 5, and 6) which extends between the center frame 13 and the left hand side frame 50 of the machine. The frame 224 has brackets or end pieces 225 so that the frame can be fastened to the frames of the machine by pins 226 and cross bars 227 and 228 (best shown in Fig. 5) integral with the brackets extend horizontally from one bracket to the other and form a central opening 229 (best shown in Figs. 5 and 6) between them in the frame to permit the insertion of the certificates between the arms of the plates $221^a$, $221^b$ and $221^c$ above described. On either side of the opening 229 is a flange $230^b$. These flanges only extend between the cutaway portion $240^a$ at the ends of the central opening 229 in the frame. The upper face of the upper flange is provided with grooves or slideways $227^a$ and $228^a$, while the lower face of the other flange is provided with corresponding grooves or slideways $229^a$ and $230^a$. The inner edges of the arms 400 and 401 of the hundreds of dollars plate slide in the left hand ends of the slideways $228^a$ and $230^a$ and the inner edges of the tens of dollars plate $221^b$ slide in the right hand ends of the slideways $227^a$ and $229^a$. The inner edges of the arms of the units of dollars plate $221^c$ also slide in the grooves $228^a$ and $230^a$ but at the opposite ends of the grooves. The upper edge of the upper arm of the tens of dollars plate slide in a groove or slideway $224^a$ and the upper edges of the upper arms of the units of dollars plate and the hundreds of dollars plate are slidable in the opposite ends of the slideway $225^a$ constructed in the lower face of a plate $226^a$ which extends between the frames 13 and 50 and is rigidly mounted on the top of the cross bar 227 so that the forward end of the plate projects over the plates $221^a$, $221^b$ and $221^c$. The side frame 50 is provided with a slot (not shown) through which the hundreds plate $221^a$ moves. The central frame 13 is also provided with slots (not shown) through which the plates $221^b$ and $221^c$ pass.

The upper arms of the plates $221^a$, $221^b$ and $221^c$ carry at their free ends punch heads, $231^a$, $231^b$ and $231^c$ respectively and each punch head is provided with a guideway 241 for its respective punch pin 230. The free ends of the lower arms of these plates $221^a$, $221^b$ and $221^c$ carry die plates $232^a$, $232^b$ and $232^c$ respectively. The position of these punch heads and die plates, on the sliding plates $221^a$, $221^b$ and $221^c$ is best shown in Fig. 6 and their shape or construction can be best seen in Fig. 2. Each of the die plates $232^a$, $232^b$ and $232^c$ has a projection 235 and from these projections depend anti-friction rollers $234^a$, $234^b$, and $234^c$ respectively. The roller $234^c$ on the units of dollars plate $221^c$ plays in the cam groove 211 on the sleeve 209 actuated by the hundreds of dollars amount lever, the roller $234^b$ on the tens of dollars plate plays in the cam groove 211 on the sleeve 212 actuated by the tens of dollars amount setting lever and the roller $234^a$ carried by the hundreds of dollars plate plays in the short spiral groove 219 actuated by the hundreds of dollars amount setting lever. These anti-friction rollers $234^a$, $234^b$ and $234^c$ pass through a slot (shown in dotted lines in Fig. 5) formed in the forward end of a plate 222 fast to the lower face of the cross bar 228 of the frame 224, this construction being employed to prevent undue strain on the pins carrying the anti-friction rollers. The punch pins 230 as shown in the Figs. 2 and 6 have hooks 236 at their upper ends which pass over a rod 237 carried at the outer ends of arms 238 fast to a rock shaft 239 which is journaled in the central frame 52 and an ear 240 projecting from the plate 226ᵃ. The lower ends of the punch pins are normally near the lower ends of the guide ways 241 in their corresponding punch heads.

From the above description it can be readily seen that differential movement of the spiral cams 233, 212, and 209 (Fig. 6) imparted thereto by the amount setting levers will slide the respective plates 221ᵃ, 221ᵇ and 221ᶜ corresponding extents through engagement of the anti-friction rollers 234ᵃ, 234ᵇ, and 234ᶜ on the plates in the grooves on their respective cams. In this manner the punch pins and the dies are brought into such a position that operation of the operating mechanism will lower the punch pins 230 to cause them to punch holes through the proper numerals at the top of the certificates and duplicates to record in this way also the amount deposited.

To actuate the punches for the purpose of punching holes through the numerals on the original certificate and the duplicates, the rock shaft 239 carrying the arms 238 is rocked at the beginning of the operation of the machine and after each duplicate has been fed into printing position by the feeding mechanism and the means for so rocking the shaft is shown in Fig. 9. A downwardly extending arm 245 fast to the shaft 239 carries at its outer end an anti-friction roller 246 which is straddled by the enlarged forked end of the lever 247 pivoted on pin 248 projecting from the central frame 13 of the machine. The lower end of the lever carries an anti-friction roller 249 riding in the cam groove 251 which is formed in the face of a disk 252 fast to the main drive shaft 11. As shown the configuration of this cam groove is such as to oscillate the lever 247 at the beginning of the rotation of the drive shaft 11 in the direction of the arrow and after each duplicate is brought into printing position by the feeding means as has been described. Oscillation of the lever rocks the shaft 239 and therefore the arms 238 to lower the punch pins 230 so that the latter will enter the holes in the corresponding dies and in this way will punch holes through the proper numerals in the certificates.

In order to prevent movement of the plates 221ᵃ, 221ᵇ and 221ᶜ which carry the punch heads and the dies, alining devices for locking the plates in their adjusted position during an operation of the machine are employed. For this purpose V-shaped alining notches 255 (Fig. 6) on the lower edge of the plates are adapted to be engaged by the beveled noses 256 of alining pawls 258 (Figs. 2 and 6). There are but two of these notches in the plate 221ᵃ carrying the punch employed for punching holes through "0" and "100" marks in the hundreds of dollars series, while the other two plates 221ᵇ and 221ᶜ have ten notches, as it was explained that the first plate has but one extent of movement from normal or zero position, while the latter plates have ten positions of adjustment. A single alining pawl 258 is employed to engage the notches of the last two mentioned plates as these notches are normally in juxtaposition to each other since the arms of the plates extend in the same direction. The alining pawl for locking the hundreds of dollars plate 221ᵃ against movement is rigidly mounted on the left hand end of the shaft 259, while the alining pawl for locking the other two plates 221ᵇ and 221ᶜ against movement is on the other end of this shaft, the shaft being supported by the central frame 13 and the side frame 50. An arm 261 extends downwardly from the shaft 259 and carries an anti-friction roller 262 which is straddled by the forked end of an arm 263 which constitutes a prong of the three pronged member 137 above referred to. Upon rotation of the drive shaft 11, the open cam 195 through engagement of the periphery of the cam with the roller 141 carried at the lower end of the arm 139 of the member 137 rocks the member clockwise as has been explained. The shaft 259 is thereby rocked in a reverse direction to carry the alining pawls into engagement with the notches 255 in the plates 221ᵃ, 221ᵇ and 221ᶜ so that the plates are locked against movement during an operation of the machine.

Any suitable form of alarm, which is sounded upon operation of the machine, can of course, be employed. In the preferred form shown in Fig. 9, a bell 265, which is mounted on the frame 12 is adapted to be struck by a hammer 266. Means for actuating the hammer for this purpose is not shown but it is obvious that this can be controlled by the operating mechanism in any desired manner.

Operation.

With this detailed description it is believed that the invention is clearly set forth, but to recapitulate, the operation of the machine will be briefly given. An original certificate of deposit with the two attached duplicates are placed in the table 153 by the proper clerk in the post office. The clerk adjusts the amount setting levers 1 and the account number setting levers 62 so that they are opposite the proper marks on the index plates secured to the cabinet and also turns the date type printing wheels 101 and 102 to set up the proper dates, if this has not been done at a previous operation.

Adjustment of the amount setting levers differentially positions the amount type carriers 43 as the gear wheels 45, fast to the respective sleeves 48 and shaft 47 to which the type carriers are fast, mesh with the driving segments 44 which are fastened to the amount setting levers through nested sleeves surrounding the pivot shaft 3 for the levers. As the amount indicators 54 are carried on sleeves 55 carrying gear wheels 57 which mesh with gear wheels 45, movement of the amount setting levers also moves the indicators directly and simultaneously to the same extent as the type carriers 43.

The spiral cams 209, 212, and 233 are also differentially rotated simultaneously with the amount type carriers 43 as the driving segments 44 are constantly in mesh with the gear wheels 215 fast to the shaft 126 and sleeves surrounding the shaft and to which the spiral cams are rigidly mounted. Through the engagement of the rollers 234ª 234ᵇ and 234ᶜ in the grooves of their respective spiral cams movements of the cams slide the plates 221ª, 221ᵇ and 221ᶜ carrying the punch heads 231ª, 231ᵇ, and 231ᶜ and dies 232ª, 232ᵇ, and 232ᶜ, respectively laterally so that the punch pins 230 slidably mounted on the shaft 237 are brought into register with the proper amount numerals at the top of the original certificate.

Adjustments of the account number setting levers 62 position the type carriers 61 and the corresponding indicators 70 in the same manner that the amount type carriers and indicators are positioned. This is effected as the driving segments 64, fast to the setting levers 62 by nested sleeves, mesh with corresponding gear wheels 66 which are connected to the type wheels 61 by nested sleeves 67. The gear wheels 72 mesh with the driving segments 64 also mesh with gear wheels 73 fast to the indicators 70 and sleeve 74.

Upon rotation of the main driving shaft after proper adjustment of the amount and account levers the platen carrying arms 157 and 158 are raised through the riding of the rollers 167 upon the arms 166 in the cam grooves 168 to simultaneously force the platens against their respective sets of type carriers so that an impression is taken on the original certificate from each set of type carriers. At the same time that the platen carrying arms are actuated the shaft 239 is rocked by the cam 251 to lower the punch pins 230 and punch holes through the numerals at the top of the original certificate and in this way also record the amount deposited.

After the original certificate has been printed and perforated the teeth 181 on the locking disk 175 engage the teeth 182ª on the locking disk 172 and the two inside feeding disks 156 are thereby rotated and through their coöperation with the feeding rollers 182 feed the first duplicate certificate into printing and perforating position, the outside feeding disks 156 and the auxiliary feed rollers 191 having been employed to feed the original certificate forward from its position in which it engaged the arms 155 until it passes between the points of contact of the feed rollers 182 and their coöperating feed disks 156. The platen carrying arms 157 and 158 and the punch pins 230 are again actuated while the locking portions of the locking disks 172 and 175 are in sliding contact to print and perforate the duplicate certificate so that it will be exactly like the original certificate.

The second set of teeth of the locking disks 172 and 175 then engage each other to move the second duplicate certificate into printing and perforating position so that when the platen carrying arms 157 and 158 and the punch pins 230 are actuated for third time this second duplicate certificate will also correspond to the original. Toward the end of the operation of the machine the last intermittent movement of the feeding disk 156 feeds the certificate out of the machine and one of the consecutive numbering type carriers is advanced one step by the pawl 125 upon restoration of the yoke 126 carrying the pawls through the cam groove 142 after the last duplicate is printed and perforated.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow:

1. In a machine of the class described, the combination with a plurality of differentially adjustable punches each punch including a die and a punch pin for perforating record material; and manipulative means controlling the extent of differential adjustment of the punches.

2. In a machine of the class described, the combination with a plurality of differentially adjustable punches, each punch including a die and a punch pin, for perforating record material; and hand levers, one for each punch, for adjusting the punches differentially.

3. In a machine of the class described, the combination with a plurality of differentially adjustable punches for perforating record material; cams for adjusting the punches differentially; and manipulative means for actuating said cams.

4. In a machine of the class described, the combination with a plurality of differentially adjustable punches for perforating record material; of spiral cams for adjusting the punches differentially.

5. In a machine of the class described, the combination with a plurality of differentially adjustable punches for perforating record material; of cams for controlling the adjustment of the punches; manipulative means for operating said cams; and operating means for actuating the punches after they have been differentially adjusted.

6. In a machine of the class described, the combination with a differentially adjustable punch for perforating record material; of a cam controlling the adjustment of said punch; a manipulative device for operating said cam; an alining device for said punch; and operating means for rendering said alining device effective for the purpose described and for actuating the punch after it has been differentially adjusted.

7. In a machine of the class described, the combination with feeding means for feeding record material; of a differentially adjustable frame carrying a punch for perforating said record material; means for differentially adjusting the frame and punch at an angle to the direction of feeding of the record material to perforate the record material at varying distances across its width; and means for actuating said punch for the purpose described after it has been differentially adjusted.

8. In a machine of the class described, the combination with a feeding device actuated intermittently at each operation of the machine for intermittently feeding record material having numerals thereon; and means for selectively perforating through the numerals on said record material after each feeding movement.

9. In a machine of the class described, the combination with differentially adjustable punches for perforating record material having a plurality of sets of numerals thereon; and means for operating the punches when adjusted a plurality of times at a single operation of the machine to make perforations through the corresponding numerals of each set.

10. In a machine of the class described, the combination with differentially adjustable punches for perforating record material having a plurality of sets of numerals thereon; of manipulative means for adjusting said punches differentially; and operating means for actuating the punches a plurality of times at a single operation of the machine to cause the same to make perforations through corresponding numerals of each set on the record material.

11. In a machine of the class described, the combination with feeding means for record material; of punches adjustable differentially at an angle to the direction of feed of the record material each punch being adapted to perforate the record material at different distances across its width.

12. In a machine of the class described, the combination with feeding means for record material; of a plurality of punches adjustable differentially in the same plane, but at an angle to the direction of feed of the record material for punching holes in a straight line across the width of the record material.

13. In a machine of the class described, the combination with differentially adjustable punches for perforating record material; and means for moving the punches differentially and in the same straight line to adjust them.

14. In a machine of the class described, the combination with a plurality of differentially adjustable plates; of a corresponding number of punches and dies, one punch and die being carried by each plate; and amount determining manipulative means for adjusting said plates differentially to bring the punches into position to perforate record material at figures on the material to record thereby the amount set up on the determining means.

15. In a machine of the class described, the combination with a plurality of differentially adjustable plates; of a corresponding number of punches and dies, one punch and die being carried by each plate; spiral projections on sleeves for adjusting said plates; and amount determining manipulative means for moving said sleeve differentially to differentially adjust the plates so that the punches are brought into position to perforate record material at figures on the record material to record the amount set up on the amount determining means.

16. In a machine of the class described, the combination with perforating means for punching holes through any selected numeral in a series of numerals on original certificates of deposit and duplicates thereof; of coöperating pairs of feeding rollers for feeding the duplicate certificates of deposit so that the proper numerals on the duplicates will be in register with the punches; and an auxiliary feeding device for feeding the original certificate to said coöperating pairs of feed rollers.

17. In a machine of the class described, the combination with a feeding device actuated intermittently at each operation of the machine for feeding record material, having a series of numerals arranged thereon; of means for punching holes through any of the numerals on the record material as desired after each feeding movement of the record material; common operating means for actuating the feeding device and the punching means; and alining devices for retaining the punching means in the proper punching position during the actuation of said feeding mechanism.

18. In a machine of the class described, the combination with an intermittently actuated feeding mechanism for feeding record material having a plurality of series of numerals arranged thereon; of means for selectively punching holes through any of the numerals in each series on the record material; alining devices for positively locking the punching means in the proper punching position during actuation of the feeding mechanism; and a common operating means for actuating the feeding mechanism, the punching means, and the alining devices.

19. In a machine of the class described, the combination with a sliding plate having an opening; of a punch, including a die, a punch pin and a guide therefor, for perforating record material, the die being carried at one side of said opening and the guide on the other side by said plate; means for moving said plate differentially; a frame for carrying said plate and having flanges with grooves in which said plate is permitted to slide and also having an opening between the flanges to permit the insertion of the paper through the opening in said sliding plate between said die and punch pin.

20. In a machine of the class described, the combination with a punch pin for perforating record material and slidably mounted on a shaft; of means for adjusting the punch differentially on the shaft; and means for moving the shaft to cause the punch pins to perforate the record material.

21. In a machine of the class described, the combination with a punch pin for perforating record material and slidably mounted on a shaft; of oscillatory arms carrying said shaft; differentially adjustable plates carrying guides for said punch pin so that adjustment of the plate also adjusts the punch pin; and means for oscillating said oscillatory arms whereby the punch pins are caused to perforate the record material.

22. In a machine of the class described, the combination with a punch pin for perforating record material and slidably mounted on a shaft; of a die plate for said punch pin; oscillatory arms carrying said shaft; means for adjusting the die plate and the punch pin differentially longitudinally of the shaft; and means for oscillating said oscillatory arms whereby the punch pins are caused to perforate the record material.

23. In a machine of the class described, the combination with a punch pin for perforating record material; of a shaft upon which said punch pin is differentially slidable; a die plate for said punch pin; and means for causing a coöperation of said punch pin and said die to perforate the record material.

24. In a machine of the class described, the combination with punch pins for perforating record material and slidably mounted on a shaft; of die plates, one for each punch pin; hand levers; cams operated by said hand levers for adjusting the punch pins and corresponding die plates differentially and longitudinally of the shaft; oscillatory arms carrying shaft, and means for oscillating said arms to cause said punch pins to perforate the record material.

25. In a machine of the class described, the combination with punch pins for making by perforations a plurality of similar records upon record material; of a shaft upon which said pins are slidably mounted; of die plates one for each punch pin; manipulative means; cams controlled by said manipulative means for adjusting said punch pins and the corresponding die plates differentially; oscillatory arms carrying said shaft; and means for oscillating said arms a plurality of times at one operation of the machine to cause the punch to make by perforations a plurality of similar impressions on the record material.

In testimony whereof I affix my signature in the presence of two witnesses.

JOHN A. WERNER.

Witnesses:
CHESTER H. BRASELTON,
CARL BEUST.

Copies of this patent may be obtained for five cents each, by addressing the "Commissioner of Patents, Washington, D. C."